INVENTOR.
PAUL DAVID DODD
BY
Arthur Decker
ATTORNEY

United States Patent Office 3,252,099

Patented May 17, 1966

3,252,099

WAVEFORM SHAPING SYSTEM FOR SLIMMING FILTER CONTROL AND SYMMETRIZING

Paul David Dodd, San Jose, Calif., assignor to International Business Machines Corporation, New York, N.Y., a corporation of New York Filed May 27, 1963, Ser. No. 283,282

9 Claims. (Cl. 328—58)

This invention relates to waveform shaping circuits and, more particularly, to such circuits as applied to pulses derived by an electromagnetic playback head adjacent to a moving surface magnetized to represent binary values.

One arrangement of playback circuitry, situated in a computer associated with one channel of recorded magnetic binaries, employs an electromagnetic head comprising a core of soft iron or the like, and coils wound thereon in which are generated the playback pulses. The output connections of a plurality of heads are made to the channel select matrix of the computer, which operates as a switch to select one stream of playback pulses to energize a bistable state circuit, such as a flip-flop.

Since flip-flop triggering is more certain if done by sharply defined pulses, it is at times advantageous to square, differentiate and amplitude limit the playback pulses. However, for greatest reliability of triggering, especially in reproducing high density recording, it is also advantageous to slim and symmetrize the playback pulses prior to this activity, and techniques therefore have been disclosed in co-pending U.S. patent applications of Carl A. Schlaepfer, Serial No. 153,520, filed November 20, 1961, and of Hugh M. Sierra, Serial No. 190,075, filed April 25, 1962; these techniques involve networks of active and passive electronic components which consider the essentially gaussian nature of the output of a magnetic head and operate as filters designed with reference to the expected shape of the playback pulses.

Such filters are admirably suited for their intended purpose where constraints are applied to playback pulse wave shape and, often, such constraints contemplate their origin at a single channel or at several channels having similar generator characteristics. However, it is desirable that the filters also be equally effective for playback pulses originating at different channels, as derived by their respective heads after switching by the channel select matrix; such playback pulses may not be closely matched. The present invention provides control circuitry which responds to the amplitude and width of a sample playback pulse recorded, preferably, as the first binary of each word on the channel, to emit a signal capable of adjusting a parameter of a pulse slimming filter as exemplified in the aforementioned patent applications. In this way, after swithcing to a head and prior to sensing the information pulses of the word, the filter is set for optimal slimming of the playback pulses from the selected channel. Of course, where memory access time criteria permit, only one sample playback pulse per channel could be provided inasmuch as this would suffice to set the present circuit as long as the same channel continues to be sensed.

It is thus an object of this invention to provide a pulse shaping circuit with means for adaptation to pulses characterized by considerable variation in electrical configuration, such as those derived from magnetic memory systems, transmission line systems directed to pulse handling, and other systems in which equalization of pulse-type signals is desirable.

It is a further and particular object of this invention to provide the above in association with the memory of a digital computer and operative on the memory playback pulses as selected and passed by the computer select matrix or other switching network. Preferably, the playback pulses are grouped in the form of words divided into bit periods in each of the latter of which may be stored a binary digit (bit). A predetermined number of words are recorded in each channel, selection of channels being made by the computer channel select matrix through energization of the appropriate playback head. The present system contemplates that the first bit period of each word store a sample bit, preferably representing a binary 1, which is not modified in the recording process, and which is used to set the system for the duration of the word, to derive a signal for controlling a pulse slimming network. The invention provides a pair of parallel paths for the sample pulse, one path devoted to circuitry which measures its peak amplitude and the other devoted to circuitry which measures its area. The outputs of the paths combine in circuitry which generates, during all of the word except the first bit period, a D.-C. voltage which is utilized to bias the amplifiers of the pulse slimmer (cf. aforementioned patent application, Serial Number 153,520). The output of the pulse slimmer, of course, drives the memory flip-flop of the computer.

The foregoing object is directed by playback pulses which are characterized by a general symmetry. However, it frequently occurs that an appreciable degree of asymmetry occurs as a result of various distortions in the recording and/or sensing techniques employed; a further object of the present invention is concerned with this problem in recognition of the facts that symmetrical pulses are more easily slimmed and detectable in densely-recorded patterns. The invention provides circuitry operative on all playback pulses, preferably prior to the aforementioned filter control circuitry, to ascertain asymmetry by differentiating to determine the two points of maximum slope of the pulse, measuring the slope at the maxmium points and subtracting the slope levels to derive a D.-C. bias for an amplifier which operates on the differentiated pulse, the resulting differentially-amplified pulse then being added to the original pulse to yield a symmetrized reproduction thereof. The symmetrized pulse is then fed to the aforementioned filter control circuitry.

As should be apparent from the foregoing description, it is a general object of this invention to provide a noise-discriminating system for amplifying and shaping the signal outputs of a computer's memory playback heads so that the resultant signals may be employed to reliably trigger the memory flip-flop.

The foregoing and other objects, features and advantages of the invention will be apparent from the following more particular description of preferred embodiments of the invention, as illustrated in the acompanying drawings.

Figure 1:
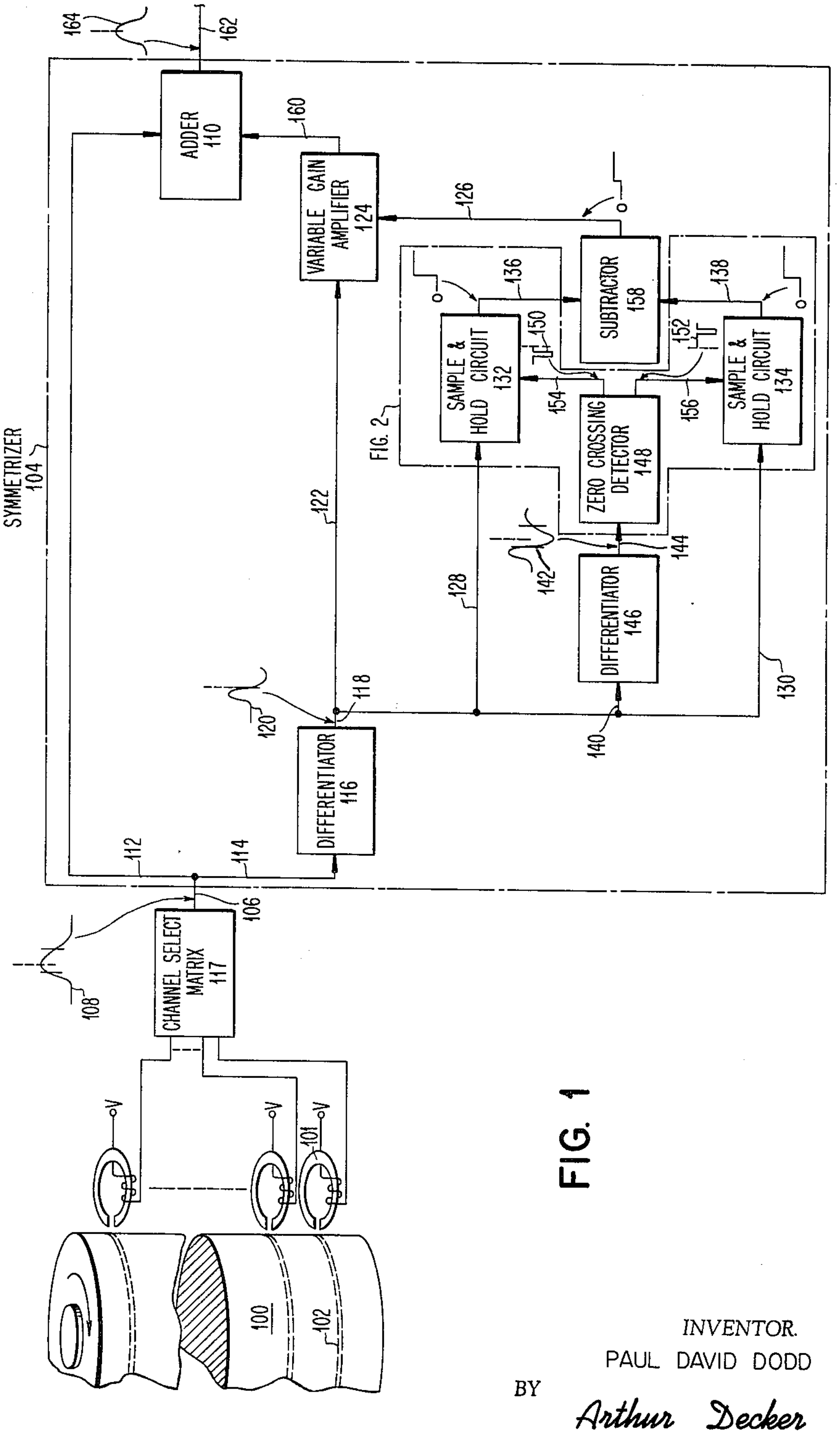
FIGURE 1 shows the symmetrizing system of the invention as adapted to receive the signal sensed by the magnetic heads associated with the channels on the rotating drum of a computer and passed by the channel select matrix.

Referring to FIGURE 1, here is shown a block diagram of symmetrizer 104 as associated with a section of memory drum 100 of a computer. Provision is made on drum 100 for a plurality of channels, such as channel 102, designated by dashed lines circumscribing drum 100. Positioned adjacent the channels so as to permit reading the magnetic binaries recorded thereon are magnetic heads, such as head 101 associated with channel 102, which comprise coils wound on split cores of ferrous material or the like, as is well known. The coils operate to sense information recorded on the channels and are connected at one end to a source of voltage V and at the other end to channel select matrix 117, which, in accordance with the presently operative computer instruction, selects a particular head output for transmission to symmetrizer 104 on line 106.

The signal on line 106, generated as a result of a change in magnetization in the selected channel corresponding to a change in recorded binary value, may be represented typically by pulse 108 which may be skewed about its peak, shown as occurring at the vertical axis; the amount of skew is measured on pulse 108 by reference to its points of maximum slope, indicated by two vertical reference marks.

In symmetrizer 104, signal 108 is led by way of two paths to adder 110, one path, line 112, being direct, while the other path, line 114, leading to wave shaping circuitry as follows. Differentiator 116 operates to peak the slopes of an input pulse and thus provides an output, on line 118, illustrated by signal 120 as having peaks positionally related to the vertical axis corresponding to the positions of the reference marks of pulse 108. Signal 120, on line 122, drives variable gain amplifier 124. The gain of amplifier 124 is controlled, via a D.-C. bias on line 126, by circuitry which generates a voltage corresponding to the positive-going maximum slope point of pulse 108 (i.e., the amplitude of the positive peak of pulse 120), and a similarly poled voltage corresponding to the negative-going maximum slope point of pulse 108 (i.e., the amplitude of the negative peak of pulse 120), and subtracts these voltages to provide the D.-C. bias.

Lines 128 and 130 lead to identical sample and hold circuits 132 and 134; these circuits provide, on lines 136 and 138, voltages whose amplitudes represents the amount of time that the circuits are permitted to accumulate charge. These times are established, for sample and hold circuit 132, by the left peak of signal 120 and, for sample and hold circuit 134, by the right peak of signal 120. The circuitry which establishes these times is fed with signal 120 by line 140 and as shown, comprises differentiator 146, driven by signal 120 to provide, on line 144, signal 142, which identifies the points of maximum slope of signal 108 (and consequently the peaks of signal 120) by converting to points of zero crossing, indicated by the two vertical reference marks on signal 142. Zero crossing detector 148 converts signal 142 to a pair of negative going pulses 150 and 152, on lines 154 and 156 leading to sample and hold circuits 132 and 134, respectively. The leading edges of pulses 150 and 152 correspond to the zero crossings of signal 142 and are utilized to control the charge accumulated by sample and hold circuits 132 and 134. For the example illustrated by the signals on FIGURE 1, these charges are represented by the signals on lines 136 and 138, referenced, for convenience, to a zero voltage level. These signals are subtracted by subtractor 158, which generates the aforementioned D.-C. bias for variable gain amplifier 124 on line 126. Amplifier 124 is thus automatically adjusted in accordance with the skew of signal 108 to provide variable gain for its differential, signal 120. As a result, the signal on its output, line 160, comprises effectively a continuous compensation, and, when added to signal 108 by adder 110, effectuates the emission, on line 162, of a symmetrical version of signal 108, indicated as signal 164. As already pointed out, signal 164 may be further modified to provide sharp pulses for driving the computer memory flip-flop.

Figure 2:
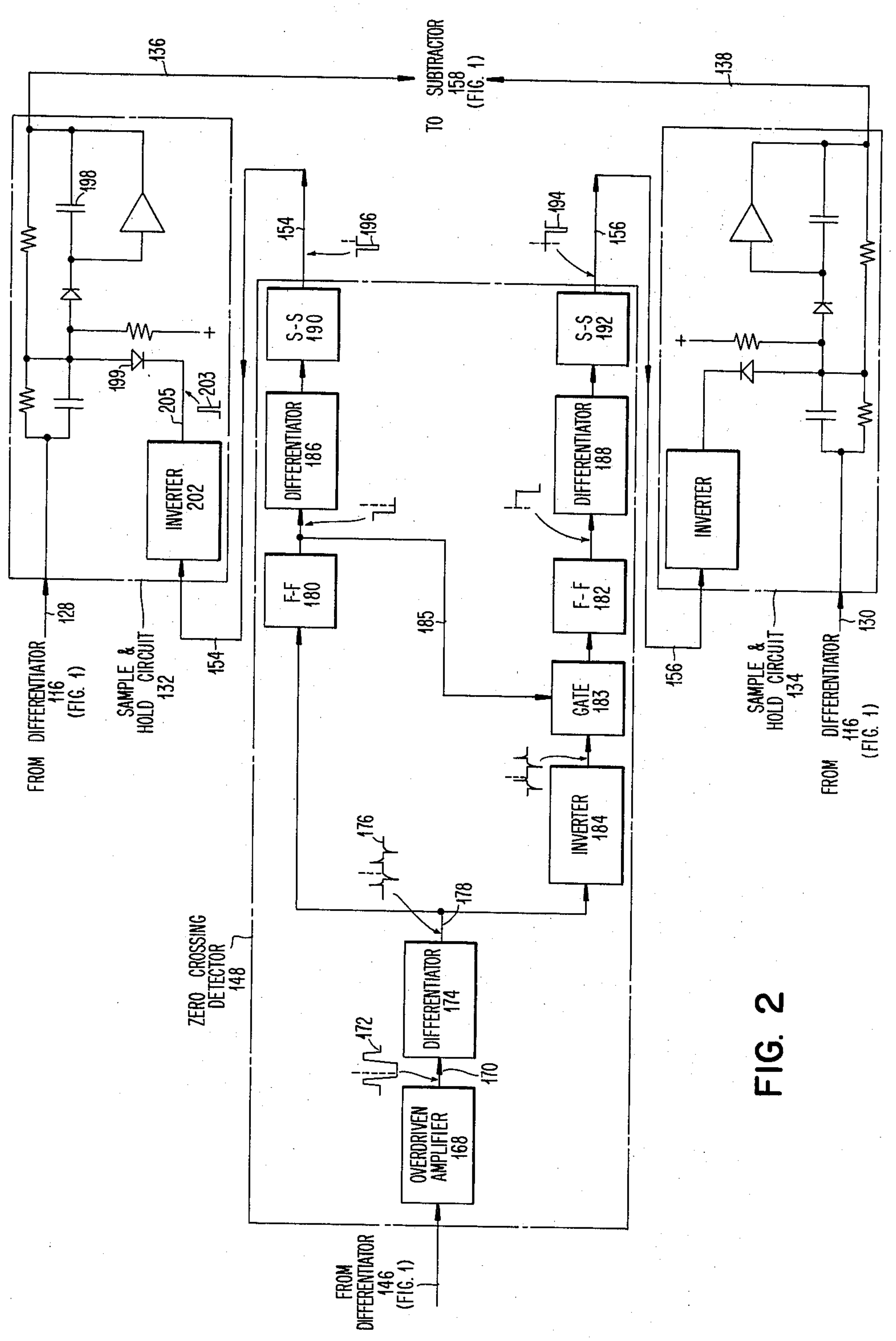
FIGURE 2 shows the zero crossing detector and sample and hold circuits of FIGURE 1 in greater detail.

FIGURE 2 is a presentation of zero crossing detector 148 and sample and hold circuits 132 and 134 of FIGURE 1; this portion of FIGURE 1 utilizes the output of differentiator 146 to generate the D.-C. bias for variable gain amplifier 124. FIGURE 2 provides greater detail where it is considered necessary to a fuller understanding thereof. Over-driven amplifier 168 accepts signal 142 and emits, on line 170, a squared-up version, signal 172, having the same crossing points on the horizontal axis. Signal 172 is peaked by differentiator 174, the result, signal 176, appearing on line 178. The remainder of the circuitry in zero crossing detector 148 serves to separate out the two center peaks, which correspond to the zero crossings of signal 172. Flip-flops 180 and 182, preferably of the set-reset type, are normally in the reset state but may be set by negative-going pulses. Thus, the negative peaks of signal 176 may set flip-flop 180 while, due to the action of inverter 184, the positive peaks may set flip-flop 182. However, gate 183, controlled via line 185 by flip-flop 180, operates to inhibit the setting of flip-flop 182 until after flip-flop 180 has been set. As a result, with regard to signal 176; the left positive peak has no effect on either flip-flop; the left negative peak sets flip-flop 180, which, in turn, opens gate 183; the right positive peak is made negative by inverter 184, passes through gate 183 and sets flip-flop 182; and, the right negative peak has no effect on flip-flop 180 because this flip-flop is already set, and has no effect on flip-flop 182 because of the conversion to a positive peak by inverter 184. The appropriate outputs of flip-flops 180 and 182 are in turn peaked by differentiators 186 and 188, respectively, and drive single shots 190 and 192, respectively, to provide, on lines 154 and 156, a pair of negative-going rectangular signals 194 and 196, the leading edge of the former occurring simultaneously with the left negative peak of signal 176 and the leading edge of the latter occurring simultaneously with the right positive peak of signal 176. The repetition rates of single shots 190 and 192 are identical and, of course, are chosen appropriately to the system parameters, including the rotation velocity of drum 100 (FIGURE 1), the speed of selection of which channel select matrix 117 is capable, etc. so as not to cause overlap of playback pulses resulting from adjacent recorded binaries.

Lines 154 and 156 feed into sample and hold circuits 132 and 134, respectively, which are identical and are seen to comprise charge accumulators controlled by signal 120 (FIGURE 1), via lines 128 and 130, to charge and which are sampled by signals 194 and 196. Referring to sample and hold circuit 132, for example, diode 199 is normally held forward-conducting, thus disconnecting capacitor 198 from line 128. When pulse 203, on line 205, occurs as a result of inversion of pulse 194 by inverter 202, capacitor 198 charges to the level reached by signal 120 at the time of occurrence of pulse 203, thus providing a corresponding D.-C. level on line 136 which remains until the occurrence of the next pulse 203. Similar activity in sample and hold circuit 134 provides a D.-C. level of line 138 corresponding to the amplitude of the negative-going excursion of signal 120. As previously indicated, the voltages on lines 136 and 138 are subtracted in subtractor 158 (FIGURE 1) to provide, on line 126, a resultant D.-C. bias for control of variable gain amplifier 124.

Figure 3:
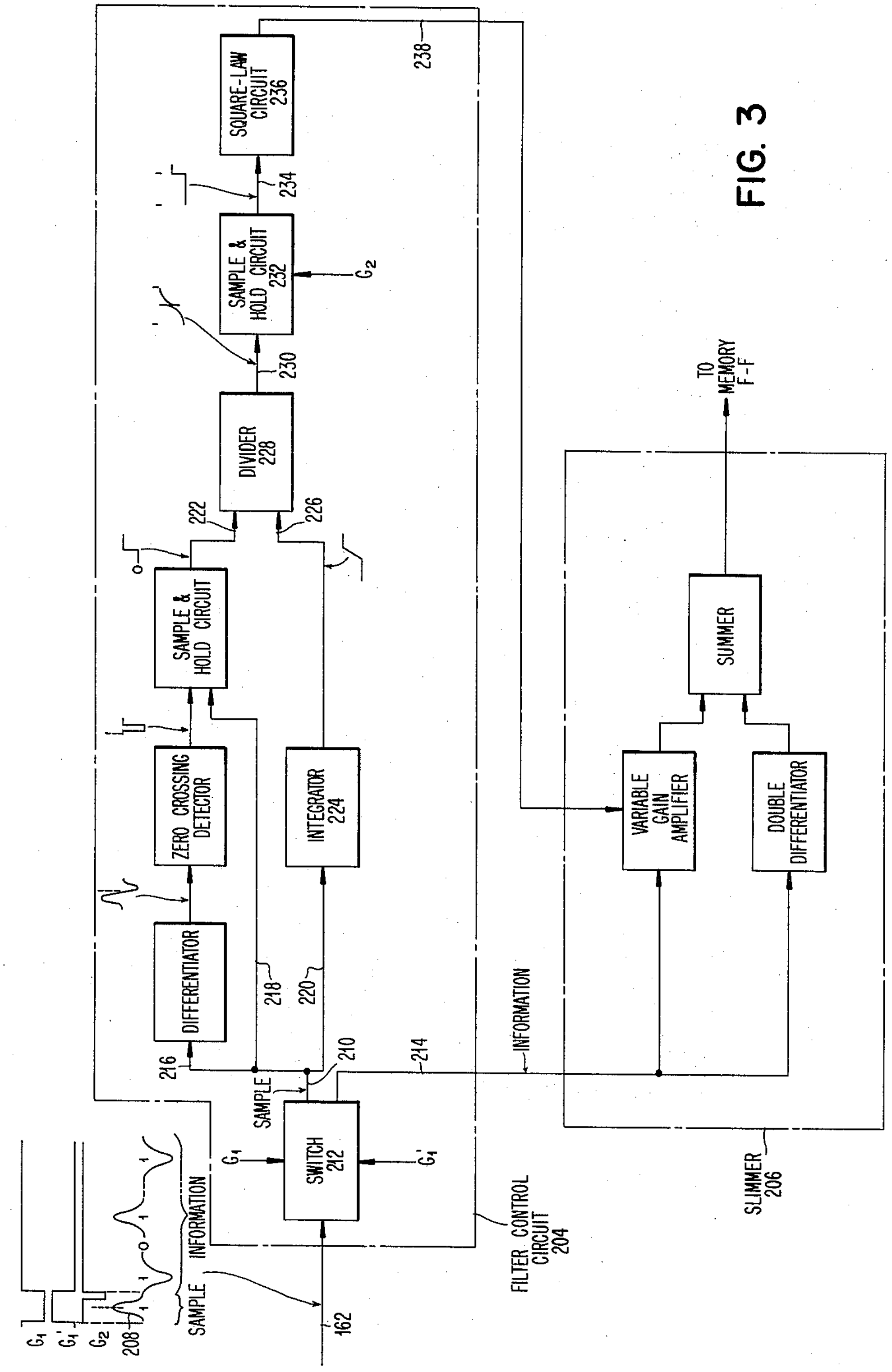
FIGURE 3 shows the filter control system provided by the invention for setting the slimmer circuit which drives the computer memory flip-flop.

The foregoing description pertains to the pulse symmetrizing technique of the invention, the inclusion of which, in the computer memory system chosen for exemplification here, is, as already mentioned, very desirable. Appropriately, signal 164, on line 162, would be used to drive filter control circuit 204, as shown in FIGURE 3. However, it should be understood that, for applications in which symmetrizing is unnecessary, connection may be made between channel select matrix 117 and filter control circuit 204.

As stated previously, filter control circuit 204 operates to adjust a pulse slimmer, which may take the form of slimmer 206, for optimum (i.e., reliable triggering of the computer memory flip-flop) slimming of information pulses comprising, for instance, a computer word or channel content. Considering an adjustment each word period, the adjustment is in accordance with a sample pulse sensed as the first information bit in the word. Since this sample pulse forms no part of the information in the word, it is apparent that gating is required to distinguish that portion of the word period devoted to the sample pulse. Such gating is sufficiently well known so as not to require detailing beyond indicating, as shown associated with signal 208, that a signal $G_1$, at a relatively negative potential, is effective to connect line 210 to line 162 through switch 212 when the sample pulse is on line 162, whereas a complementary signal $G_1'$, at a relatively negative potential, is effective to connect line 214 to line 162 through switch 212 during the rest of the word period.

During the first bit period of the word, then, it is the function of filter control circuit 204 to adjust the gain of the variable-gain amplifier in slimmer 206, which is exemplified by a pulse slimmer known in the art. The adjustment is made, as in the case of symmetrizer 104 of FIGURE 1, by generating a D.-C. bias, the bias amplitude being a function of the waveshape of the sample pulse of signal 208 and, once established, remains throughout the word period.

The operation of filter control circuit 204 may be represented as the formation of the quotient $$\frac{s_{max}}{\int s dG_1}$$

$s_{max}$=peak amplitude of the sample pulse,
$\int dG_1$=time period for which signal $G_1$ is effective,
$s$=instantaneous amplitude of the sample pulse which is inversely proportional to the width of the sample pulse.

The sample pulse appears on lines 216, 218 and 220, the former two paths serving to generate a D.-C. voltage on line 222 proportional to the peak amplitude of the sample pulse. This circuitry may be identical to that shown in FIGURES 1 and 2 as comprising differentiators 146, 174 and 186, over-driven amplifier 168, flip-flop 180, single shot 190 and sample and hold circuit 132. The path leading from line 220 includes integrator 224, which forms, on line 226, the integral of the instantaneous amplitudes of the sample pulse over the time interval established by the negative portion of signal $G_1$, indicated in connection with signal 208.

The quotient of the voltages on lines 222 and 226 is obtained by divider 228, the output signal therefrom, on line 230, being proportional to their ratio. Line 230 is fed into sample and hold circuit 232, in which the quotient signal is converted to a D.-C. level, utilizing discharge control from gating signal $G_2$, effective at the end of the sampling bit period, as shown in connection with signal 208. The output from sample and hold circuit 232, via line 234, drives square-law circuit 236, which provides, on line 238, the square-law function required of variable control of a pulse slimmer such as slimmer 206, for a reasonable range of widths of pulses to be slimmed.

Those skilled in the art will now appreciate that the system of the invention, as illustrated in the example described, is straightforward and reliable and admirably suited to fulfill the objects stated. However, it should be apparent that the forms of the circuits may be different from those shown and they will still perform functionally within the constraints imposed by the example. Additionally, it is not intended that the invention be limited to the specific arrangement of components chosen as preferred since other connections may operate similarly.

It may further be noted that, in the above description and the accompanying drawings, various degrees of detailing have been selected for the circuits, corresponding generally to the present state of the art with regard thereto. For instance, circuits such as embodied in channel select matrix 117, switch 112, the circuits included in zero crossing detector 148, adder 110, subtractor 158, delay 200, inverters 184 and 202, the differentiators and the amplifiers, are considered sufficiently well known not to require description or even reference to examples in the art. On the other hand, the sample and hold circuits although essentially shown in "Computer Handbook" by H. D. Huskey and G. A. Korn, McGraw-Hill, Inc., New York, 1962, in FIGURE 6.3.1(b) on page 6–27, have been shown here in exemplary schematic detail, since some minor variation is preferred; their operation should be apparent to a skilled practitioner of the computer art. For other circuits, reference may be made to such standard texts as "Electron-Tube Circuits" by S. Sealy, McGraw-Hill, Inc., New York 1950, and "Design Fundamentals of Analog Computer Components" by R. M. Howe, D. Van Nostrand, Inc., Princeton, New Jersey 1960. For instance, divider 228 may be found at paragraph 8–7 of the former and square-law circuit 236 may be found at paragraph 4.3.3.2 of the latter.

While the invention has been particularly shown and described with reference to preferred embodiments thereof, it will be understood by those skilled in the art that various changes in form and details may be made therein without departing from the spirit and scope of the invention.

What is claimed is:

1. A control circuit for a slimmer of a pulse from a source thereof, comprising:
first means connected to the source to derive a voltage representing the maximum amplitude of the pulse;
second means connected to the source to derive a voltage representing the area of the pulse; and
third means responsive to said first and second means to derive a voltage for control of the slimmer.
said third means including a divider circuit utilizing the voltage from said second means as divisor and the voltage from said first means as dividend.

2. A control circuit for a pulse slimmer responsive to a sampling pulse to become set for a predetermined number of subsequent pulses, comprising:
first means to derive a voltage representing the peak amplitude of the sampling pulse;
second means to derive a voltage representing the area under the sampling pulse; and
a divider responsive to said first and second means to derive a voltage representing the quotient of the peak voltage divided by the area voltage.

3. The combination of claim 2 and a square law circuit connected between said divider and the pulse slimmer and responsive to the quotient voltage from said divider to derive the control voltage for the pulse slimmer.

4. The combination of claim 2 and a pulse symmetrizer connected to receive and shape all pulses and having its output connected to said first and second means.

5. The combination of claim 4, and,
a plurality of sources for the pulses, and
a matrix for selecting among said sources and wherein said matrix has its output connected to said symmetrizer.

6. The combination of claim 3, and
a plurality of sources for the pulses, and,
a matrix for selecting among said sources and wherein said matrix has its output connected to said control circuit.

7. In a computer having a cyclical memory arranged as a plurality of channels for storing magnetic binaries, the binaries in each channel being sensed by a playback head in which are generated corresponding pulse signals having a range in variation in waveshape, a pulse shaping system for standardizing the pulse signals, comprising:
means responsive to the asymmetry of the pulse signals to generate corresponding symmetrical pulse signals,
means responsive to the amplitude and area of the symmetrical pulse signals to generate a control voltage, and
a slimmer responsive to the control voltage to generate narrowed pulse signals corresponding to the symmetrical pulse signals.

8. The combination of claim 7 in which the magnetic binaries are grouped in the form of words, each comprising a sample binary followed by a plurality of information binaries.

9. The combination of claim 8 and gating means connected between said symmetrizing means and said control voltage generating means and operable to effect a change in output of said control voltage generating means during only the sample pulse of a word.

References Cited by the Examiner

UNITED STATES PATENTS

| | | | |
|---|---|---|---|
| 2,748,283 | 5/1956 | Merrill et al. | 328—38 X |
| 3,039,059 | 6/1962 | Fisher | 328—127 X |
| 3,105,939 | 10/1963 | Onno et al. | 328—146 |

ARTHUR GAUSS, *Primary Examiner.*

S. D. MILLER, *Assistant Examiner.*